(12) United States Patent
Horne

(10) Patent No.: US 7,953,214 B2
(45) Date of Patent: *May 31, 2011

(54) CALLER ID SYSTEM WITH RETRANSMITTED CALLER ID INFORMATION

(75) Inventor: Gregory L. Horne, Argyle, TX (US)

(73) Assignee: Curio Ltd., Fort Worth, TX (US)

( * ) Notice: Subject to any disclaimer, the term of this patent is extended or adjusted under 35 U.S.C. 154(b) by 1082 days.

This patent is subject to a terminal disclaimer.

(21) Appl. No.: 11/787,047

(22) Filed: Apr. 13, 2007

(65) Prior Publication Data

US 2007/0253543 A1    Nov. 1, 2007

Related U.S. Application Data

(63) Continuation of application No. 10/780,050, filed on Feb. 17, 2004, now Pat. No. 7,266,187, which is a continuation of application No. 09/978,270, filed on Oct. 15, 2001, now Pat. No. 6,700,957, which is a continuation-in-part of application No. 09/206,716, filed on Dec. 7, 1998, now Pat. No. 6,298,122.

(51) Int. Cl.
*H04M 1/56* (2006.01)
*H04M 15/06* (2006.01)
*H04M 3/42* (2006.01)

(52) U.S. Cl. ......... 379/142.06; 379/142.01; 379/142.07; 379/211.01

(58) Field of Classification Search .. 379/142.01–142.07, 142.18, 88.19–88.21, 379/93.23, 211.01, 211.02, 212.01; 455/415–417
See application file for complete search history.

(56) References Cited

U.S. PATENT DOCUMENTS

| | | | |
|---|---|---|---|
| 4,120,031 A | 10/1978 | Kincheloe et al. |
| 4,266,098 A | 5/1981 | Novak |
| 4,277,649 A | 7/1981 | Sheinbein |
| 4,791,664 A | 12/1988 | Lutz et al. |
| 4,802,202 A | 1/1989 | Takahashi et al. |
| 4,803,484 A | 2/1989 | Schutrum et al. |
| 4,817,133 A | 3/1989 | Takahashi et al. |
| 4,845,743 A | 7/1989 | Lutz |
| 4,850,013 A | 7/1989 | Rose |
| 5,029,196 A | 7/1991 | Morganstein |
| 5,109,405 A | 4/1992 | Morganstein |

(Continued)

FOREIGN PATENT DOCUMENTS

EP    0559047    9/1993

(Continued)

*Primary Examiner* — Quoc D Tran
(74) *Attorney, Agent, or Firm* — Bracewell & Giuliani LLP

(57) ABSTRACT

Upon detecting an incoming call, a call screening system determines the CALLER ID information associated with the call and compares it to a database of allowable calling parties. If the calling party is to be allowed to ring through, the call screening system routes the incoming call to one or more communication devices associated with the calling party information in the allowable calling party database. Incoming call screening may be selectively different during different times of the day, for different calling parties, or for different communications devices connected to the call screening device. The call screening device may thus switch between allowing all incoming calls to ring through except those specifically designated to be blocked and screening all incoming calls except those specifically designated to be permitted to ring through. One or more override codes entered in a touch-tone keypad by the calling party may permit an incoming call to ring through despite an active screening mode.

11 Claims, 6 Drawing Sheets

U.S. PATENT DOCUMENTS

| | | | |
|---|---|---|---|
| 5,128,988 A | 7/1992 | Cowell et al. | |
| 5,157,712 A | 10/1992 | Wallen, Jr. | |
| 5,161,181 A | 11/1992 | Zwick | |
| 5,200,994 A | 4/1993 | Sasano et al. | |
| 5,341,411 A | 8/1994 | Hashimoto | |
| 5,347,574 A | 9/1994 | Morganstein | |
| 5,361,295 A | 11/1994 | Solomon et al. | |
| 5,388,150 A | 2/1995 | Schneyer et al. | |
| 5,446,785 A | 8/1995 | Hirai | |
| 5,452,346 A | 9/1995 | Miyamoto | |
| 5,467,388 A * | 11/1995 | Redd et al. | 379/210.02 |
| 5,497,414 A | 3/1996 | Bartholomew | |
| 5,533,106 A | 7/1996 | Blumhardt | |
| 5,535,265 A | 7/1996 | Suwandhaputra | |
| 5,559,894 A | 9/1996 | Lubliner et al. | |
| 5,563,935 A | 10/1996 | Small | |
| 5,568,399 A | 10/1996 | Sumic | |
| 5,589,834 A | 12/1996 | Weinberg | |
| 5,602,908 A | 2/1997 | Fan | |
| 5,661,788 A | 8/1997 | Chin | |
| 5,737,400 A | 4/1998 | Bagchi et al. | |
| 5,856,791 A | 1/1999 | Gray et al. | |
| 5,905,774 A | 5/1999 | Tatchell et al. | |
| 5,995,603 A | 11/1999 | Anderson | |
| 6,006,088 A | 12/1999 | Couse | |
| 6,029,092 A | 2/2000 | Stein | |
| 6,044,148 A | 3/2000 | Bleile | |
| 6,069,571 A | 5/2000 | Tell | |
| 6,073,169 A | 6/2000 | Shuey et al. | |
| 6,088,659 A | 7/2000 | Kelley et al. | |
| 6,134,320 A | 10/2000 | Swan et al. | |
| 6,160,877 A | 12/2000 | Tatchell et al. | |
| 6,163,602 A | 12/2000 | Hammond et al. | |
| 6,177,884 B1 | 1/2001 | Hunt et al. | |
| 6,199,068 B1 | 3/2001 | Carpenter | |
| 6,259,972 B1 | 7/2001 | Sumic et al. | |
| 6,263,071 B1 | 7/2001 | Swan et al. | |
| 6,289,084 B1 | 9/2001 | Bushnell | |
| 6,298,122 B1 | 10/2001 | Horne | |
| 6,329,928 B1 | 12/2001 | Hershey | |
| 6,332,021 B2 | 12/2001 | Latter et al. | |
| 6,346,875 B1 | 2/2002 | Puckette et al. | |
| 6,363,057 B1 | 3/2002 | Ardalan et al. | |
| 6,496,575 B1 | 12/2002 | Vasell et al. | |
| 6,700,957 B2 | 3/2004 | Horne | |
| 7,266,187 B2 * | 9/2007 | Horne | 379/142.06 |

FOREIGN PATENT DOCUMENTS

JP  7-95639  9/1993

* cited by examiner

US 7,953,214 B2

CALLER ID SYSTEM WITH RETRANSMITTED CALLER ID INFORMATION

RELATED APPLICATIONS

This Application is a Continuation of and claims the benefit of and priority to U.S. patent application Ser. No. 10/780,050 filed on Feb. 17, 2004, now U.S. Pat. No. 7,266,187 which is a Continuation of U.S. patent application Ser. No. 09/978,270, now U.S. Pat. No. 6,700,957, titled "Caller ID System with Retransmitted Caller ID Information" filed on Oct. 15, 2001, which is a Continuation-In-Part of U.S. patent application Ser. No. 09/206,716, filed, Dec. 7, 1998 now U.S. Pat. No. 6,298,122, titled "Caller ID System" issued on Oct. 2, 2001, each incorporated by reference herein in their entireties.

BACKGROUND OF THE INVENTION

1. Field of the Invention

The present invention relates generally to communication devices and services and in particular to communication devices and services employing calling party identification information to process incoming calls. Still more particularly, the present invention relates to a communication device or service employing calling party identification information together with a customizable database of allowable calling parties to determine whether and how to route an incoming call.

2. Description of the Related Art

Communications devices, including telephones, facsimile (fax) machines, answering machines, paging devices, and the like, have become an integral part of both business and domestic environments. While offering tremendous convenience and facilitating interpersonal contact and information exchange, these devices may also serve as an source of aggravation and annoyance.

A variety of caller identification, call screening and call blocking devices and/or services are offered or have been contemplated. Generally, however, such devices and services merely display calling party identification information while letting the call ring through. Incoming calls thus continue to disturb the receiving party and disrupt their activity. Existing devices and service also typically lack the capacity for customization, so that different calling parties may automatically be handled differently.

It would be desirable, therefore, to provide a mechanism for preventing an incoming call from disturbing the called party unless the called party wishes to receive the call, which also includes the capacity to be customized so that different calling parties are automatically handled differently.

SUMMARY OF THE INVENTION

Upon detecting an incoming call, a call screening system determines the CALLER ID information associated with the call and compares it to a database of allowable calling parties. If the calling party is to be allowed to ring through, the call screening system routes the incoming call to one or more communication devices associated with the calling party information in the allowable calling party database. In this manner, certain screened calls only ring through to a handset if authorized, while others are authorized to ring through to a fax machine, an answering machine, another handset, or a remote device connected between a remote handset and the local exchange. A single call screening device having several ports thus filters calls to multiple communications devices. Incoming call screening may be selectively different during different times of the day, for different calling parties, or for different communications devices connected to the call screening device. The call screening device may thus switch between allowing all incoming calls to ring through except those specifically designated to be blocked and screening all incoming calls except those specifically designated to be permitted to ring through. One or more override codes entered in a touch-tone keypad by the calling party may permit an incoming call to ring through despite an active screening mode.

In one aspect of the invention, caller ID data received between bursts 1 and 2 may be re-transmitted between burst 2 and 3. The system of the subject invention is adapted for identifying and connecting the required ports once the caller ID transmission is received, and well before the second ring burst is sent from the communications provider. This provides the port connections to be made while then monitoring for the second ring burst. The caller ID data is then re-framed. Since the required ports are connected, the communication devices on these ports will actually see the second ring burst as a first ring burst and will be ready to receive the caller ID re-transmission and update data accordingly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
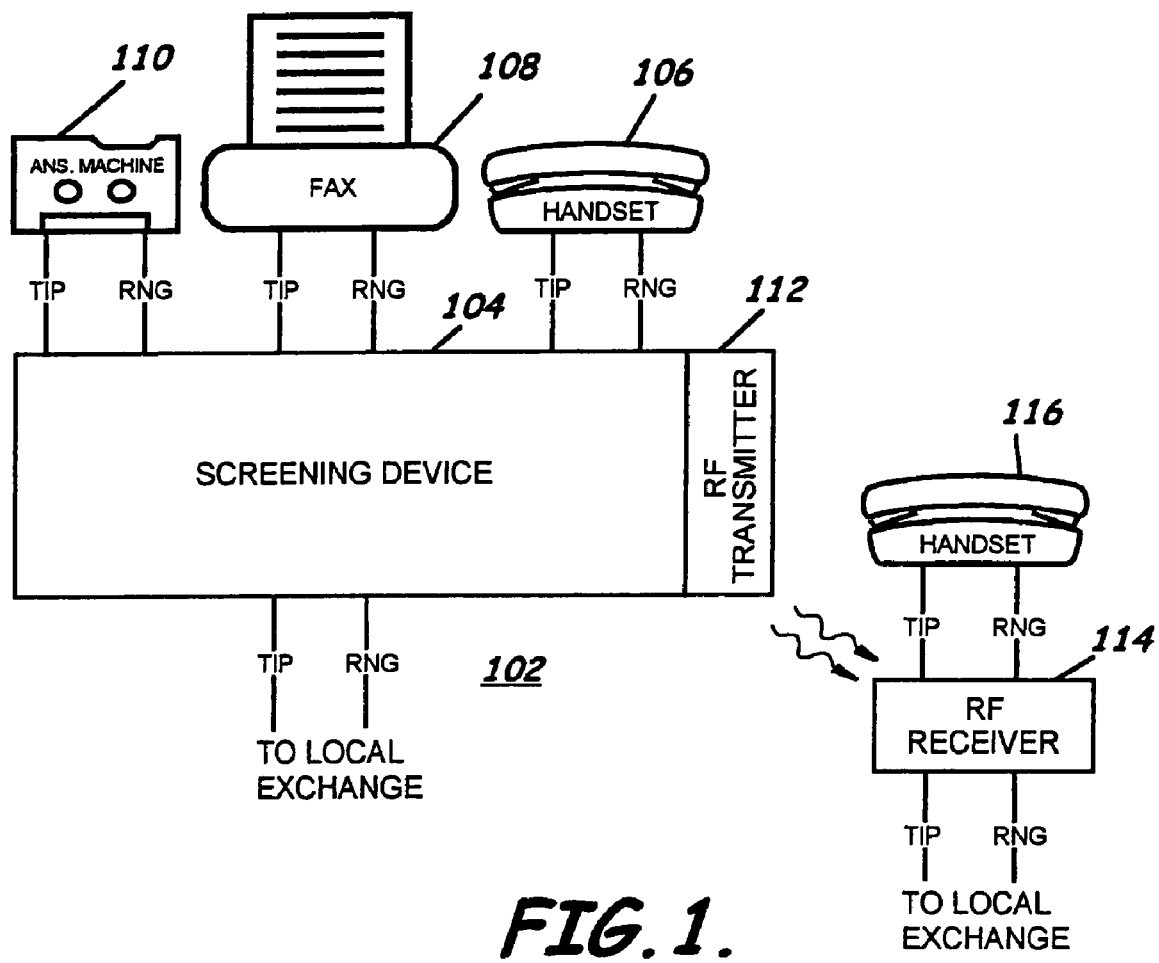
FIG. 1 depicts a diagram of a call screening and handling system in accordance with a preferred embodiment of the present invention.

With reference now to the figures, and in particular with reference to FIG. 1, a diagram of a call screening and handling system in accordance with a preferred embodiment of the present invention is depicted. Call screening and handling system 102 includes a call screening device 104, described in further detail below, connected between a local telephone exchange and one or more communication devices. The communications devices connected to call screening device 104 may include, for example, a handset 106 directly connected to call screening device 104, a facsimile (fax) machine 108, and an answering machine 110. All connections between call screening device 104 and communication devices 106, 108, and 110 may be by standard, two wire telephone wiring having RJ-11 connectors.

Call screening device 104 is a customer premises equipment (CPE) device employed in conjunction with a CALLER ID service offered by the local telephone service provider. An incoming call's CALLER ID calling party identification information is normally available between the first and second ring signals, which are generated and detected in accordance with the known art. CALLER ID information, which is also generated and detected by methods known in the art, is typically a frequency shift key (FSK) signal transmitted on the telephone wiring. Call screening device 104 employs the CALLER ID information to determine whether to pass the incoming call to one of the communications devices, and also to determine which device to which the incoming call should be passed.

Upon detecting the CALLER ID information for an incoming call, call screening device 104 checks a database of allowable calling parties. If a match for the calling party's CALLER ID information is found within the database authorizing acceptance of the incoming call, call screening device 104 routes subsequent ring signals to a communication device connected to call screening device 104. Thus, ring signals are only received by the communications devices if the calling party for an incoming call is an allowable calling party. In this manner, the called party is not disturbed unless the incoming call originates from a caller previously identified as one to which the called party desires to speak.

Call screening system 102 differs from presently available call screening and call blocking devices or services, which typically either block only specific incoming calls while allowing all others to ring through or allow the call to ring through while displaying calling party identification information. In either case, the called party may be disturbed by unwanted calls ringing through. In the present invention, however, the first call ring signal(s) are blocked or suppressed until the incoming call is validated as originating from an allowable calling party. Call ring signals are not passed to handsets or other devices which generate an audible indication of the incoming call until the origin of the call is validated. In this way, the called party is not bothered by an incoming call which would not be validated by matching the associated CALLER ID information with an authorization.

Call screening device 104 maintains or is associated with a database of allowable calling parties, which are recognized by associated CALLER ID information. If the CALLER ID information detected for an incoming call matches an entry within this database, the incoming call is routed to one of the communications devices, such as handset 106. Therefore, if a call rings through on handset 106 when call screening device 104 is operating, the called party knows that the incoming call is from someone to whom they wish to speak. Call screening device 104 thus effectively acts as a gatekeeper or security mechanism for incoming calls.

The database of allowable calling parties may support wildcards in the form of pound (#) or asterisk (*) symbols. The user may thus designate all incoming calls from a certain area code or prefix to be received. For example, a database entry of 817-###-#### might allow all incoming calls from the 817 area code to accepted, while a database entry of 972-751-#### might allow all incoming calls within the area code 972 and prefix 751 to be accepted. The user could thus allow all calls from a particular area code (e.g., corresponding to a particular city such as Washington, D.C.) or from a particular prefix (e.g., corresponding to a residential or business development) to be accepted. The chances of receiving telephone solicitations from a residential neighborhood is small.

The database of allowable calling parties may also support CALLER ID "names" for validation and acceptance of incoming calls by call screening device 104. For instance, when receiving a cellular call, the CALLER ID information displays "WIRELESS CALL." A user may wish to accept all such calls, which are unlikely to originate from telephone solicitors because of the high call costs.

When call screening device 104 does not locate a matching entry for the CALLER ID information associated with an incoming call, the call is either not answered or routed to answering machine 110, which may record a message from the calling party without disturbing the called party. The CALLER ID information associated with the incoming call may also be automatically logged for later review by the user.

Typically, call screening device 104 may connect ring signals and other signals from an incoming call to handset 106 upon determining that the calling party was previously designated as allowable. If handset 106 is not picked up within a predetermined number of rings, call screening device 104 may reroute the incoming call to answering machine 110. Alternatively, since most answering machines automatically answer calls after a predetermined number of rings, call screening device 104 may route an incoming call for which a match was determined in the allowable calling party database to both handset 106 and answering machine 110 concurrently, allowing whichever device responds first to take the incoming signals. As described in further detail below, ports in call screening device 104 to which communications devices are connected are individually identified so that signals may be selectively routed.

Call screening device 104 may also include a port for connection to a fax machine. Fax solicitations are an increasing source of disruption in homes and businesses. Incoming faxes may thus be filtered utilizing the same call screening device which screens voice calls, allowing a single database of allowable calling parties to be employed for all communications devices within a residence or enterprise.

Call screening device 104 may also include a radio frequency (RF) transmitter 112 and an RF receiver 114. RF transmitter and receiver 112 and 114 may operate at standard frequencies for cordless telephones. RF receiver 114 is connected between a second handset 116 and the local telephone exchange, allowing call screening device 104 to remotely control calls ringing through to handset 116 via RF transmitter 112. This allows calls to be both screened and selectively routed only to certain communications devices in different areas of a residence or enterprise.

If an incoming call should be routed to second handset 116, transmitter 112 may send control signals to receiver 114 allowing incoming ring signals received from the local telephone exchange to be passed to handset 116, along with subsequent signals if handset 116 is lifted off-hook. A number of RF receivers, each responding to a different control signal from transmitter 112, may be connected between the local telephone exchange and remote handsets. The need for special wiring within a residence or enterprise is thus avoided. Other wireless devices such as, by way of example, cellular telephones, PDA's, pagers, and wireless fax machines can also be accommodated in a similar manner, eliminating any need for special wiring requirements. Specifically, the system supports receiving and screening incoming calls and directing the calls to selected ports including, but not limited to, hardwired ports, wired and wireless network gateways, cellular telephones, wireless systems and limited range RF systems.

Call screening and handling system 102 may optionally include additional functionality described below. Furthermore, those skilled in the art will recognize that while the exemplary embodiment of the present invention is depicted as a CPE device, much of the same call screening functionality may be provided as a service by a local telephone service provider, implemented within a switch operated by the telephone service provider. The CPE device implementation is preferred, however, since call handling or routing functionality for multiple communications devices may be combined with the call screening function to achieve additional benefits.

Figure 2:
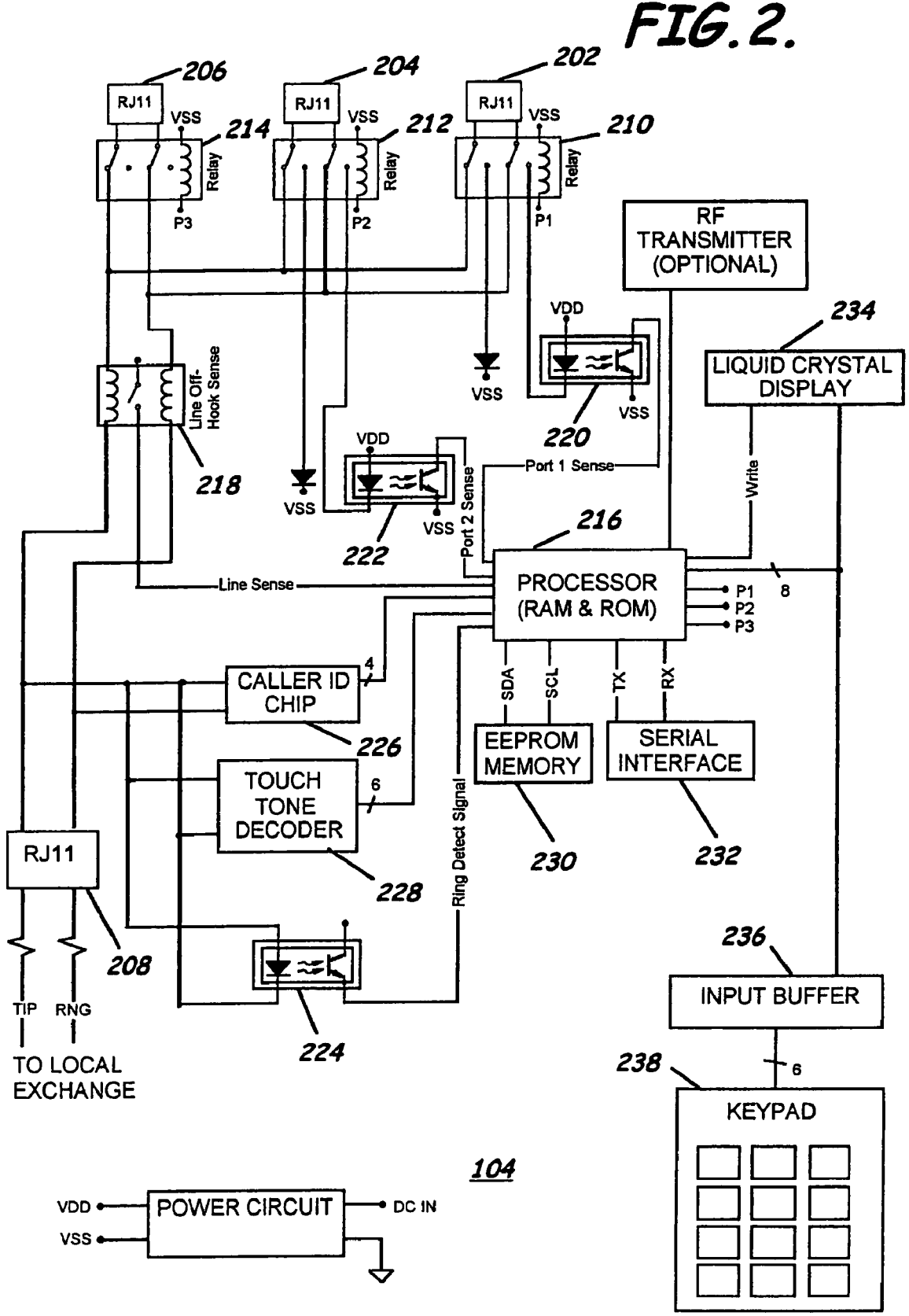
FIG. 2 is a circuit diagram for a call screen device in accordance with a preferred embodiment of the present invention.

Referring to FIG. 2, a circuit diagram for a call screen device 104 in accordance with a preferred embodiment of the present invention is illustrated. Call screening device 104 may be implemented as a discrete device connecting to other communications devices as previously described, also providing a CALLER ID display. Call screening device 104 may alternatively be integrated into the base station of a cordless telephone, into an answering machine, into a combination cordless telephone and answering machine, into a fax machine, etc. A discrete device is preferred to permit the user flexibility in selecting which communications devices to control utilizing call screening device 104.

Call screening device 104 includes a plurality of individually controlled ports P1 202, P2 204, and P3 206, which are designated in the exemplary embodiment for connection to a local handset, a fax machine, and an answering machine, with each including a female RJ-11 connector. A female RJ-11 connector is also provided for incoming line port 208 for connection to the local telephone exchange. The local exchange is supplied by a local telephone service provider and generates TIP and RNG signals on twisted wire pairs entering the residence or enterprise building. RJ-11 is the standard 4 or 6 pin modular plug connection used extensively in the communications and computer networking industry. Typically, only the center two pins of the RJ-11 plugs are employed to pass the TIP and RNG signals, although other configuration (e.g., second phone line) may be supported by call screening device 104.

Ports P1 202, P2 204, and P3 206 are selectively coupled to incoming line port 208 and thus to the local exchange by separate dual pole, dual throw (DPDT) relays 210, 212, and 214, respectively. Relays 210, 212, and 214 should be configured to connect ports P1 202, P2 204 and P3 206 to the local exchange if call screening device is powered-off, so that a power failure does not prevent use of the telephones. DPDT relays should be utilized to allow processor 216 to sense when ports go off-hook, through port sense circuits 220 and 222. Although only three ports are shown in the exemplary embodiment, the design scales easily for additional ports.

Processor 216 generates signals P1, P2 and P3 controlling connection of ports P1 202, P2 204, and P3 206 to the local exchange by relays 210, 212, and 214. Processor 216 may be selectively configured to control relays 210 and 214 connected to ports P1 202 and P3 206, which are designated for the local handset and answering machine, respectively, either together or separately. Thus, the user may decide whether the answering machine and local handset are connected to the local exchange simultaneously in response to an incoming call, or only the local handset is initially connected and the connection rolls over to the answering machine after a predetermined number of rings.

When screening device 104 is on and screening mode is active, the contacts in relays 210, 212, and 214 are in the opposite orientation of that depicted. When a communications device connected to call screening device 104 at one of ports P1 202, P2 204, or P3 206 is lifted off-hook, as by lifting the receiver of a handset or opening a contact in a fax machine, the associated port sense input (either Port 1 Sense input from Port 1 sense circuit 220 or Port 2 Sense input from Port 2 sense circuit 222 in the depicted example) for processor 216 is connected to VSS. Processor 216 may then connect that port to the local exchange to allow outgoing calls to be placed.

When screening device 102 is not on, line off-hook sensor 218 is connected between ports P1 202, P2 204, and P3 206 and incoming line port 208, and also between an upper power supply voltage VSS and processor 216. Line off-hook sensor 218 operates in accordance with known techniques to generate a signal indicating when a communications device connected to call screening device 104 is lifted off-hook, as by lifting the receiver of a handset or opening a contact in a fax machine. When one of the communications devices connected to ports P1 202, P2 204, and P3 206 is lifted off-hook, the line sense input for processor 216 is connected to VSS.

When no incoming call is being handled while call screening device 104 is in call screening mode, processor 216 continuously polls the line sense input and, upon detecting a line off-hook signal, closes relays 210, 212, and 214 to connect ports P1 202, P2 204, and P3 206 to incoming line port 208 to allow outgoing calls to be placed. A line off-hook sensor may be included in each RF receiver controlled by call screening device 104 to allow outgoing calls to be placed by remote handsets.

In addition to line off-hook sensor 218, the exemplary embodiment also includes separate Port 1 and Port 2 off-hook detect sensor-indicators 220 and 222. In the embodiment illustrated, sensor-indicators 220 and 222 are integrated light-emitting diodes (LEDs) and photo-switches connecting Port 1 and Port 2 sense inputs to processor 216. Call screening device 104 thus provides an indication of which communication device connected to call screening device 104 is in use. An off-hook sensor-indicator may also be included both for each additional RJ-11 port provided by call screening device 104 and for each remote handset coupled to and controlled by call screening device 104 by an RF transmitter/receiver pair.

Call screening device 104 further includes a ring detect sensor-indicator 224, having the same construction as sensor-indicators 220 and 222, connected to incoming line port 208 and to ring detect input of processor 216. Ring detect sensor-indicator 224 optically isolates processor 216 from signal lines TIP and RNG, transferring the ring signals from a 48 VDC level down to a 5VDC level or lower. Ring detect sensor-indicator 224 detects ring signals generated in accordance with the known art on lines TIP and RNG connected to incoming line port 208 from the local exchange. Call screening device 104 thus provides a visual indication of incoming calls, but does not allow the handset to ring unless the calling party is identified as allowable. Processor 216 may continuously poll the ring detect input connected to sensor-indicator 224, or alternatively may allow the signal on the ring detect input to serve as an interrupt initiating a process for handling incoming calls.

Also connected to incoming line port 208 is a CALLER ID module 226. CALLER ID module 226, coupled to processor 216 by a 4 conductor bus, is preferably an integrated circuit handling the FSK modulated signal employed to transmit CALLER ID information, such as the MITEL MT8841. When CALLER ID information is presented between the first and second ring signals of an incoming call, module 226 frames the data and sends it to processor 216 in a serial stream.

Processor 216 preferably includes on-chip random access memory (RAM) for storing the CALLER ID information associated with incoming calls. Each incoming call typically has CALLER ID information including the name and number of the calling party as well as a time tag. Thus the onboard timer function of processor 216 may be updated with the most recent received time, simply generating the elapsed time since the last call for display updates, rather than including a real time clock.

Call screening device 104 also includes a touch-tone decoder module 228, which is also an integrated circuit such as the MITEL MT8870, connected to TIP and RNG lines from the local exchange and coupled to processor 216 by a 6 conductor bus. Decoder module 228 listens for a specific band of frequencies including the touch-tone standard, detects tones and digitizes them into 4-bit words (16 codes) which are presented to processor 216. This allows an override function to be employed by the calling party.

Since the touch tones cannot be entered by the calling party until after the incoming call has first been answered, call screening device 104 may connect an incoming call to the answering system and, upon detection of a predetermined pattern of touch tone signals, generate a tone utilizing an on-board electronic tone device (not shown) indicating that the call screening is being overridden. After one of ports P1 202, P2 204, and P3 206 is subsequently lifted off-hook, call screening device 104 may then connect the incoming call to the port which was lifted off-hook.

In some cases, the calling party may be calling from an area which does not have the CALLER ID network in operation, resulting in no or incomplete CALLER ID information associated with an incoming call. Alternatively, the calling party may be calling from a number which is not within the allowable calling party database, such as a pay phone or a hotel or airport phone. Touch-tone decoder module 228 allows the calling party to circumvent the call blocking scheme which would otherwise prevent the call from ringing through. By entering a predetermined sequence of numbers (e.g., "*475") on the keypad of the calling handset, the calling party may override the call screening function of call screening device 104 and force connection to the handset. The override sequence may be selectively programmed by the user and changed as often as necessary or desired. Upon detecting any touch-tone frequencies, decoder module 228 interrupts processor 216 and sends digitized touch-tone signals. Processor 216 compares these digitized signals to the current override sequence and, if a match is determined, generates the ring signals as described above and then closes relay 210 to allow the remainder of the call to ring through to the local handset. Separate override sequences may be programmed for each port or remote handset coupled to call screening device.

Call screening device 104 may also include TIME OFF and TIME ON capability to allow the user to only screen calls during certain times of the day, for example at night when the possibility of receiving unwanted solicitations is much higher. Call screening device 104 may thus be set to screen calls between, for instance, 9:00 p.m. and 7:00 a.m. to avoid being awakened by a wrong number or other unwanted call.

Processor 216 may include an on board read-only memory containing microcode for the start-up routine and the processes executed by processor 216. An erasable, electrically-programmable read-only memory (EEPROM) 230 is connected to processor 216 in accordance with the known art to store allowable calling party CALLER ID information and associated parameters, as well as parameters for programmable features of call screening device 104. Processor 216 and EEPROM 230 are connected by an industry standard I2C serial bus. Serial interface 232 to processor 216 may be provided for linking to a personal computer for additional programming or for troubleshooting.

Call screening device 104 also includes a liquid crystal display 234 connected to processor 216 and an input buffer 236 by an 8 conductor bus. Input buffer 236 receives and buffers input from keypad 238. Input buffer 236 and display 234 may share a common I/O bus since display 234 is a write-only device while keypad 238 and input buffer 236 form a read-only device. CALLER ID information may be saved to the allowable calling party database either by pressing a SAVE button on keypad 238 while the information is displayed, or by dialing the number on a local handset connected to call screening device 104 and pressing the SAVE button when all numbers are displayed. CALLER ID information may be removed from the database by pressing a DELETE button while the information is displayed.

After handling an incoming call, call screening device 104 resets and awaits the next incoming call. As previously noted, call screening device 104 may be turned off without affecting the operation of communications devices connected to the local exchange through call screening device 104.

Figure 3:
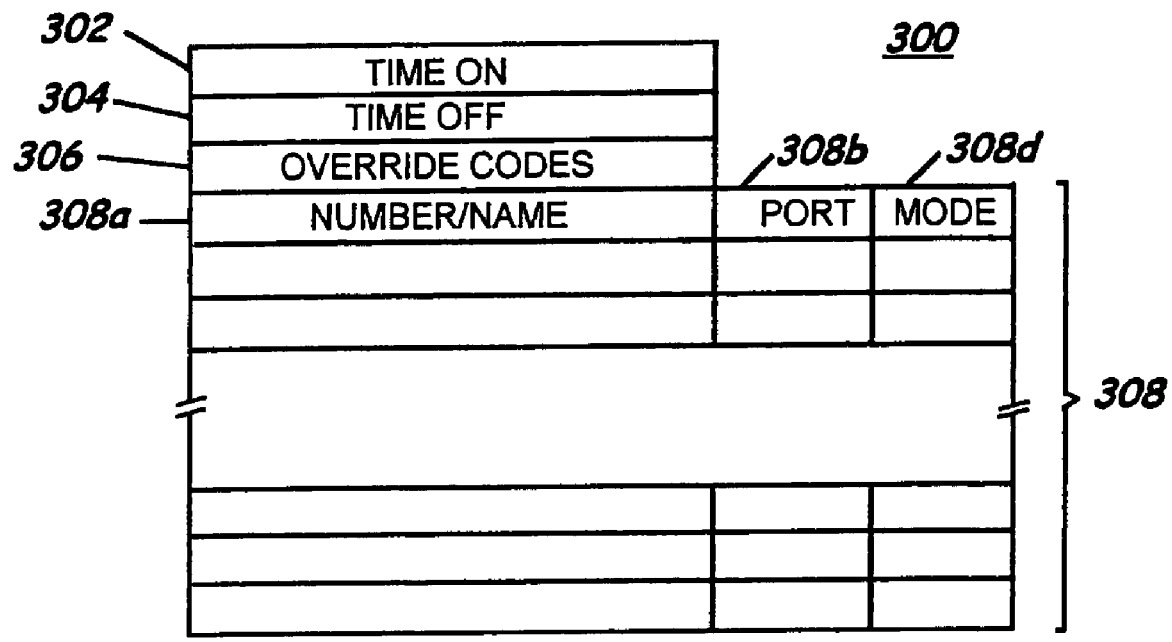
FIG. 3 depicts a diagram of a data structure which may be employed by a call screening device in accordance with a preferred embodiment of the present invention.

With reference now to FIG. 3, a diagram of a data structure which may be employed by a call screening device in accordance with a preferred embodiment of the present invention is depicted. Database 300 includes a plurality of fields for programmable features of the call screening device, such as TIME ON field 302, TIME OFF field 304, and OVERRIDE code field 306. Different override codes may be maintained for different devices, so that one override code permits calls to ring through to the local handset while a different override code allows calls to ring through to a remote handset. Database 300 also includes a plurality of allowable calling party entries 308. Each allowable calling party entry 308 includes several fields, such as the CALLER ID name or number of the allowable calling party 308a and a port field 308b identifying the port or remote device to which the call should be routed.

Port field 308b allows the call to ring through to one or more ports within call screening device 104 or one or more remote handsets coupled to call screening device 104. Certain calling parties may thus be allowed to ring through to all communications devices connected or coupled to call screening device 104, or to only particular devices. Additionally, port field 308b may optionally identify a fictitious port for totally blocked calling parties. If the user has a teenager, the CALLER ID information of that teenager's friends may be employed to have incoming calls from those friends rings through only to a remote handset.

Incoming calls from a particular calling party may always be blocked simply by not entering any port identification in the calling party entry within database 300. Without any port being designated, the call screening device will merely disconnect the incoming call. The user can thus designate certain calling parties to be blocked (such as a solicitor who calls repeatedly). Mode field 308d allows the user to select certain modes of operation for an identified calling party.

Figure 4:
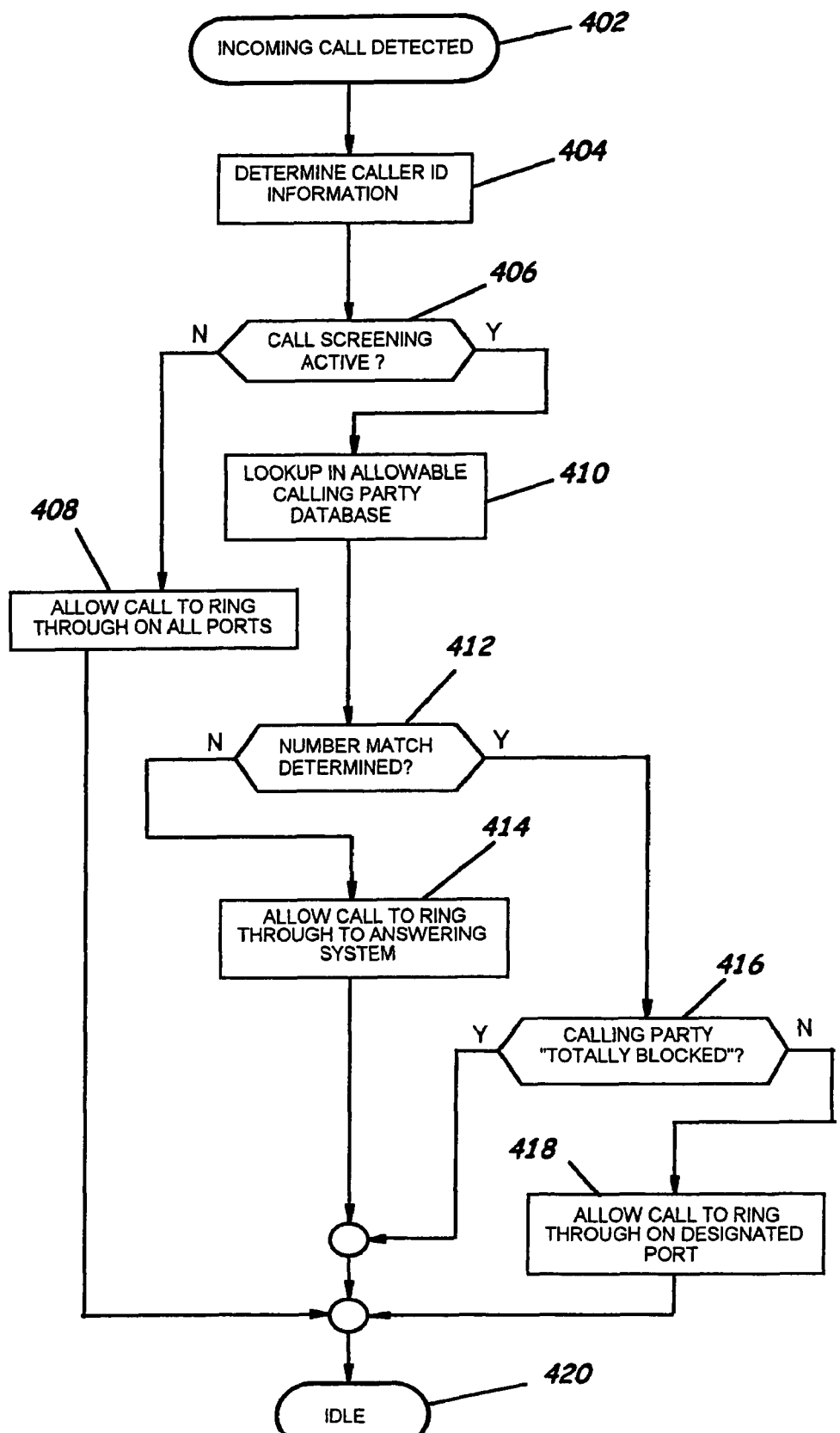
FIG. 4 is a high level flowchart for a process of screening calls in accordance with a preferred embodiment of the present invention.

Referring to FIG. 4, a high level flowchart for a process of screening calls in accordance with a preferred embodiment of the present invention is illustrated. The process begins at step 402, which depicts detection of an incoming call. The process next passes to step 404, which illustrates determining the CALLER ID calling party information associated with the incoming call, and then to step 406, which depicts a determination of whether the call screening function is active. This may involve a comparison on the present time, derived from the CALLER ID information, for example, to the TIME ON and TIME OFF settings. If call screening is not presently active, the process proceeds to step 408, which illustrates allowing the call to ring through on all ports, or as many ports as designated for no active call screening at the time the incoming call is received. If call screening is active at the time the incoming call is received, however, the process next proceeds to step 410, which depicts looking up the calling party by the CALLER ID name or number, or both, in the allowable calling party database.

The process next passes to step 412, which illustrates a determination of whether a match is determined between the CALLER ID information associated with the incoming call and an entry within the allowable calling party database. If not, the process proceeds to step 414, which depicts allowing the call to ring through to the answering system. If so, however, the process proceeds instead to step 416, which illustrates a determination of whether the calling party is "totally blocked," or designated as never to be accepted. If the calling party is totally blocked, the process proceeds to step 420, which illustrates the process becoming idle until another incoming call is detected.

Otherwise, if either a matching entry within the allowable calling party database is determined in step 412 and the calling party is not determined to be designated as "totally blocked" in step 416, the process proceeds instead to step 418, which depicts allowing the call to ring through to a port designated within the allowable calling party database. As used in the description of this figure, "port" is intended to embrace connections ports as described above as well as mechanisms for coupling the call screening system to control remote handsets, such as RF transmitter/receivers as described above. From either of steps 414 or 418, the process then passes to step 420, which illustrates the process becoming idle until another incoming call is detected.

It is important to note that while the present invention has been described in the context of a fully functional device and/or system, those skilled in the art will appreciate that the mechanism of the present invention and/or aspects thereof are capable of being distributed in the form of a computer readable medium of instructions in a variety of forms for execution on a switch processor or the like, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

As described above, multiple ports are screened from the incoming rings and thus the incoming caller ID transmission. Once the ports to be connected are identified, the ring signal passes to the communication devices attached to the respective ports. Since a majority of phone sets are available with caller ID, these would not be able to display the pertinent information about the call that was routed to the handset since it would be lost during the screening process. A modification of the invention permits retransmission of the caller ID information during subsequent ring bursts, thereby passing the previously screened caller ID on to the caller ID handset of the connected telephone.

Figure 5:
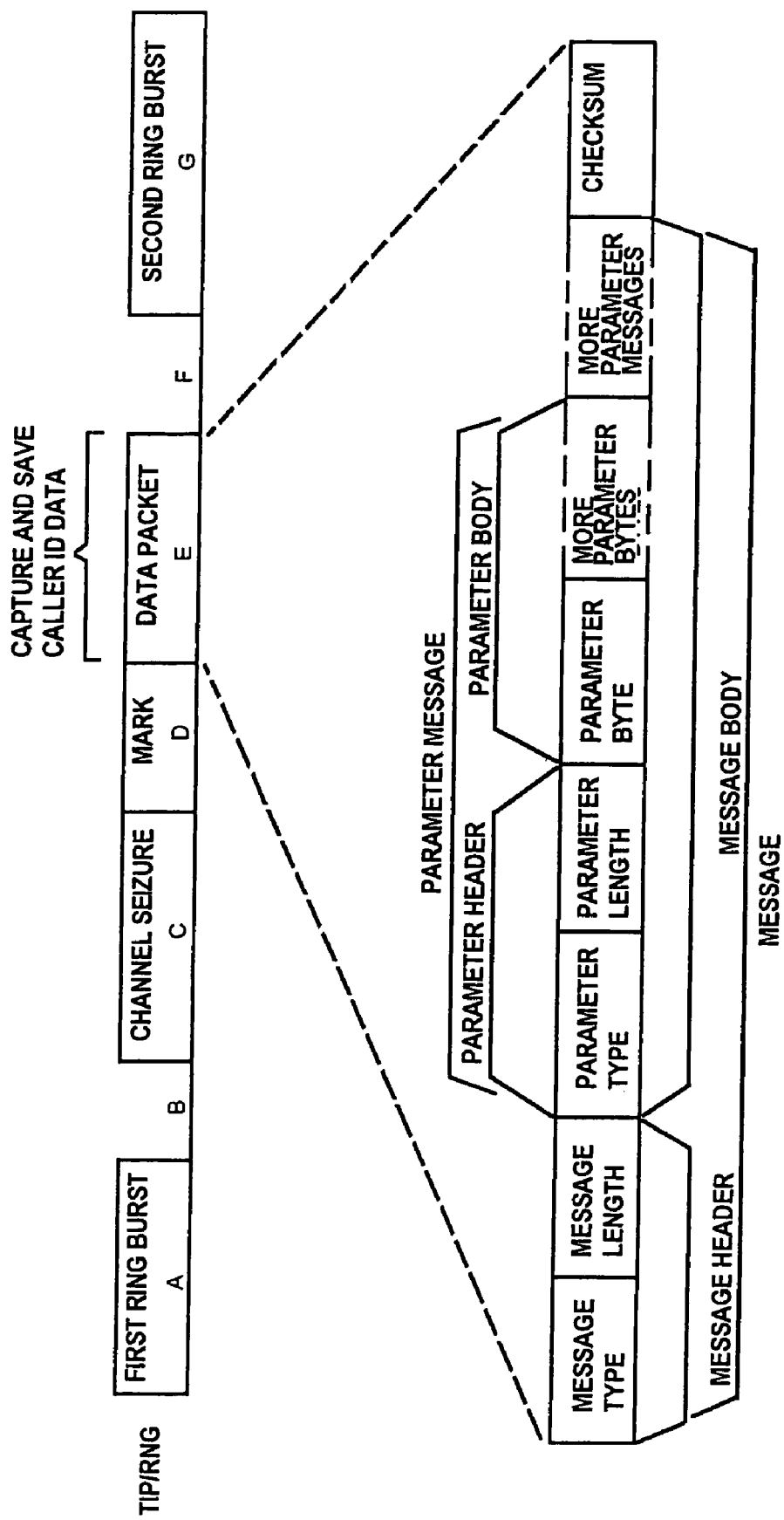
FIG. 5 is a data map, showing how the data packet is captured between the first ring burst and second ring burst of second generation caller ID devices.

The data map is shown in FIG. 5. As there shown, the first ring burst occurs during time block A. After a short interval B, the synchronizing data in blocks C and D is sent, followed by a data packet in block E. The data packet includes the message type, message length, parameter message and checksum. This is followed by a short interval block F and a second ring burst as indicated by block G. In a typical application the first ring burst will last approximately 0.2-3 seconds. The short interval block B lasts about 0.5-1.5 seconds. The combined blocks C, D and E last 2.9 to 3.7 seconds. The second interval block F is approximately 200 milliseconds. The second and subsequent ring bursts last about 1.8-3 seconds. A detailed explanation of this sequence and the data contained in the data blocks can be found in the MITEL Application Note MSAN-164 for Application of the MT8843 Calling Number Identification Circuit 2, incorporated by reference herein.

It is important to note that not all incoming calls will include an information packet containing caller ID information. In such instances the subject invention permits a selected default mode to handle the call. Specifically, if an incoming call does not include a caller ID packet the call will be selectively: (1) passed directly through to the handset; (2) passed directly to the answering machine or system; or (3) blocked from passing through at all, permitting the caller to receive a continuous ringing tone with no answer. This permits all incoming calls to be handled by the system, whether or not the incoming call includes a caller ID packet.

Figure 6:
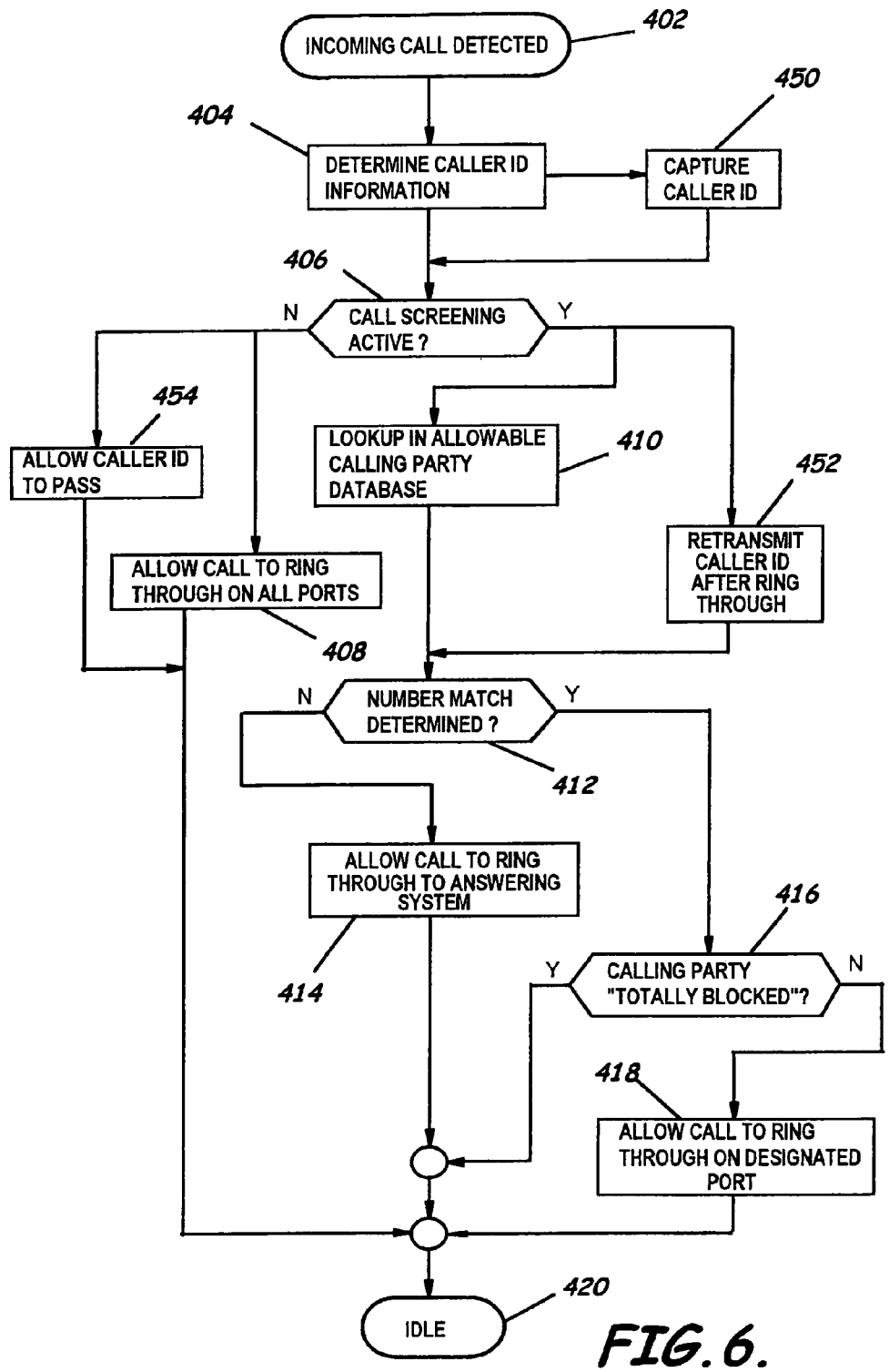
FIG. 6 is a high level flowchart for a process of screening calls and retransmitting caller ID information in accordance with a preferred embodiment of the present invention.

The enhancement permitting capture and re-transmission of the essential data blocks is shown in FIG. 6. With specific reference to FIG. 1, it will be understood that the enhancement described herein is part of the screening device 104. However, as specifically shown in FIG. 6, the high level flow diagram is modified to permit capture and retransmission of the caller ID information so that it can be sent to a caller ID handset 115 (FIG. 1) or other caller ID equipped device after the first ring received by the handset (typically the second ring burst of the received transmission). With specific reference to FIG. 6, it will be noted that the incoming call is detected at 402 and the caller ID information is determined at 404, as in the flow diagram of FIG. 4. However, in this embodiment, the critical caller ID data (see FIG. 5) is captured as indicated at 450, and held until an initial ring burst is transmitted to the handset and/or selected device(s), as indicated at 408 if ringing to all ports or to a designated port as indicated at 414 and 418. After transmission of the initial ring to the ports, the captured caller ID data is retransmitted, as indicated at 452. This permits the handset and other caller ID equipped devices to receive the caller ID information immediately after the first ring burst such device receives after the screening system screens and directs the incoming transmission. This allows caller ID information which is sent only after the first ring burst to be forwarded to the respective devices even thought it is not repeated after the first ring burst and is not transmitted due to the screening process. Specifically, the caller ID information is captured at the end of the first ring burst and then retransmitted after the subsequent ring burst which is the initial ring burst to be transmitted to the respective devices. This allows caller ID equipped devices to take advantage of the screening properties of the invention without losing caller ID capability. When the call screening system is not active as indicated at 406, the captured caller ID is transmitted after the first ring as indicated at 454 since the first ring passes through as indicated at 408.

This Application is a Continuation of U.S. patent application Ser. No. 10/780,050, now U.S. Pat. No. 7,266,187, titled "Caller ID System with Retransmitted Caller ID Information" filed on Feb. 17, 2004, which is a Continuation of U.S. patent application Ser. No. 09/978,270, now U.S. Pat. No. 6,700,957, titled "Caller ID System with Retransmitted Caller ID Information" filed on Oct. 15, 2001, which is a Continuation-In-Part of U.S. patent application Ser. No. 09/206,716, now U.S. Pat. No. 6,298,122, titled "Caller ID System" issued on Oct. 2, 2001, each incorporated by reference herein in their entireties.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of identifying incoming calls, comprising:
receiving the incoming call from a telecommunication service provider network;
determining presence of an information packet including caller identification information associated with an incoming call received at a customer equipment premises location;
responsive to the caller identification information being associated with a pre-selected allowable calling party:
allowing an audible indicator at the customer equipment premises location to sound, and
retransmitting the caller identification information after allowing the audible indicator to sound;
responsive to the caller identification information not being associated with a preselected calling party, passing the incoming call to an answering system at the customer equipment premises location through a selected one of a plurality of answering system device ports without allowing the audible indicator to sound; and
if no presence of an information packet including caller identification information is determined, handling the incoming call in accordance with a default mode selectively controlled by a user.

2. The method of claim 1, further comprising visually indicating to a user of the answering system for each separate incoming call the presence of each separate incoming call when being received without providing a corresponding audio indication of the incoming call.

3. The method of claim 1, wherein the handling step comprises lighting a visual indicator light to provide a visual indication of the incoming call at the customer premises location without providing a corresponding to audio indication of the incoming call when there is no caller identification information associated with the incoming call received from the telecommunication service provider network, and transmitting the call to an answering system device after providing the visual indication.

4. The method of claim 1, wherein the handling step comprises transmitting the call to a user selected one of a plurality of live ports.

5. The method of claim 1, wherein no caller ID packet is included with the incoming call when there is no caller identification information associated with the incoming call.

6. The method of claim 1, wherein the default mode is selectively different during different times of day.

7. A method of processing incoming calls, comprising:
receiving the incoming call from a telecommunication service provider network
responsive to detecting an incoming call received at a user premises location, determining presence of an information packet including caller identification information associated with the incoming call without allowing an audible indicator of the presence of the incoming call to sound;
responsive to determining permissibility of passing the incoming call:
identifying a communications device at the user premises location within a plurality of communication devices to which the incoming call should be routed,
allowing the audible indicator to sound at the identified communication device; and
retransmitting the caller identification information after allowing the audible indicator to sound;
responsive to the identified communication device being lifted off hook after the audible indicator sounds, maintaining a connection of the incoming call to the identified communication device; and
if no presence of an information packet including caller identification information is determined, handling the incoming call in accordance with a default mode selectively controlled by a user.

8. The method of claim 7, further comprising visually indicating to a user of the answering system for each separate incoming call the presence of each separate incoming call when being received without providing a corresponding audio indication of the incoming call.

9. The method of claim 7, wherein the handling step comprises lighting a visual indicator light to provide a visual indication of the incoming call at the customer premises location without providing a corresponding to audio indication of the incoming call when there is no caller identification information associated with the incoming call received from the telecommunication service provider network, and transmitting the call town answering system device after providing the visual indication.

10. The method of claim 7, wherein the handling step comprises transmitting the call to a user selected one of a plurality of live ports.

11. The method of claim 7, wherein no caller ID packet is included with the incoming call when there is no caller identification information associated with the incoming call.

* * * * *